United States Patent

[11] 3,587,039

[72] Inventors: Milo M. Backus; Earl C. Wisler, both of Dallas, Tex.
[21] Appl. No.: 860,112
[22] Filed: Sept. 22, 1969
[45] Patented: June 22, 1971
[73] Assignee: Texas Instruments Incorporated, Dallas, Tex.
Continuation of application Ser. No. 408,121, Nov. 2, 1964, now abandoned.

[54] SECTION MULTIPLE ATTENUATOR
4 Claims, 4 Drawing Figs.

[52] U.S. Cl. ................................................ 340/15.5 R
[51] Int. Cl. ................................................. G01v 1/00
[50] Field of Search ...................................... 340/15.5

[56] References Cited
UNITED STATES PATENTS
3,284,763  11/1966  Burb et al. .................... 340/15.5
3,346,862  10/1967  Raudsep ....................... 340/15.5

Primary Examiner—Rodney D. Bennett, Jr.
Assistant Examiner—Joseph G. Baxter
Attorneys—Samuel M. Mims, Jr., James D. Dixon, Andrew M. Hassel, John E. Vandigriff, Harold Levine and Richards, Harris and Hubbard.

ABSTRACT: Disclosed is a process for suppressing multiple reflection energy in an electrical seismic trace by time domain filtering the trace with a filter whose parameters are defined by the matrix equation $Y_m = X^{11}Z$ where $Z$ is the cross-correlation coefficient function between the seismic trace undelayed on one hand and on the other hand delayed a time interval of the order of the record time of the primary reflection from the first multiple generator, $X$ is the auto-correlation coefficient function of the trace and $Y_m$ is the function designating filter weights.

INVENTORS:
MILO M. BACKUS
EARL C. WISLER

ATTORNEY

SECTION MULTIPLE ATTENUATOR

This application is a continuation of applicants' application Ser. No. 408,121, filed Nov. 2, 1964 for Section Multiple Attenuator, now abandoned.

This invention relates to seismic exploration, and more particularly, to the removal of multiple reflections from seismic signals by cross-equalization filtering.

Geophysical prospecting is concerned primarily with the problem of locating and determining the nature of geological structures which are buried far below the surface of the earth. Geophysical prospecting methods are concerned with the measurement of various physical properties of the earth and the interpretation of such measurements.

Seismic prospecting is a primary method employed in geophysical exploration. As practiced, it consists essentially of the steps of initiating a disturbance in the earth's crust, and recording the resultant earth motion sensed at a number of spaced detector stations. The resultant recording or seismogram traditionally has taken the form of a plurality of galvanometer traces positioned side by side on a strip of photographic paper, and often is referred to as a wiggle trace recording. Such a record is readily examined visually. A particular seismic event on the record can be identified as a reflection from the subsurface beds by reason of time coincidence of high amplitude similar waveforms. If the seismic velocity of the subsurface material is known, it becomes a relatively straightforward problem in geometry to calculate the depth of the reflecting interface and its angle of dip.

Most of the problems associated with seismic prospecting are not related to the latter calculations but are concerned with the identification on the seismogram of the seismic events to which the computations may properly be applied. Generally, the seismic impulse generated in the earth's crust is not a simple function. On the contrary, the seismic disturbance generally employed is of great complexity. Energy is radiated in all directions from the source. A fraction of the energy travels downwardly along a given ray path to a reflection point from which it returns back to the earth's surface where it is detected. The medium through which the waves travel is a complex layered structure which acts to render the resultant recordings difficult to interpret.

Seismic energy reflected upwardly from subsurface interfaces upon arrival at the earth-air boundary is also reflected downwardly, thus giving rise to multiple reflections which may have arrival times coinciding with later or deeper primary reflections. These additional reflections are frequently referred to as surface multiples, in that each undergoes reflection at the earth-air boundary or at the base of the near-surface weathered zone.

Multiples due to a single reflection at a near-surface bed of high velocity-density contrast, as at the earth-air boundary itself, have an amplitude of a greater order than internal multiples, i.e., those which do not include the reflection from the almost perfect reflector at the near-surface interface. When there are three bounces, one of which occurs at the surface or near-surface interface, the resultant reflection signal is a first multiple.

Multiple reflections are often encountered. The problem to which the present invention is directed is to identify and remove the unwanted multiple energy from a seismogram.

At the present stage of development of seismic exploration, seismic signals are recorded in phonographically reproducible form, as on magnetic tape, in which case the signals may be reproduced as electrical signals or traces and processed in accordance with various criteria to render less difficult the proper interpretation of the data. One of the methods of processing seismic data for improving the reliability of interpretation has been to apply cross-correlation and auto-correlation techniques in order to identify the coherent reflection signal properties therein.

The present invention is directed to eliminating section multiples, and employs a cross-equalization filter produced by cross-correlating and auto-correlating the seismic signal trace to define the properties of the cross-equalization filter. The seismic signal trace is then filtered by the cross-equalization filter to produce an output signal trace free from the multiple from which the cross-equalization filter was synthesized.

In accordance with the invention, multiples are removed where seismic waves are generated and detected to produce an information signal which includes a primary reflection and a multiple reflection. An auto-correlation function $X$ of the information signal is generated for a plurality of delay intervals. A cross-correlation function $Z$ is generated for a like plurality of delay intervals where the cross-correlation is between the seismic information signal undelayed on one hand and on the other hand delayed a time interval of the order of the record time of the primary reflection from the first multiple generator, and over a time gate which excludes the primary reflection in the undelayed information signal. The information signal is time-domain filtered with relative amplitudes ($Y_m$) as in the matrix relationships $X Y_m = Z$.

For a more complete understanding of the present invention and for further objects and advantages thereof, reference may now be had to the following description taken in conjunction with the accompanying drawings in which.

Figure 1:
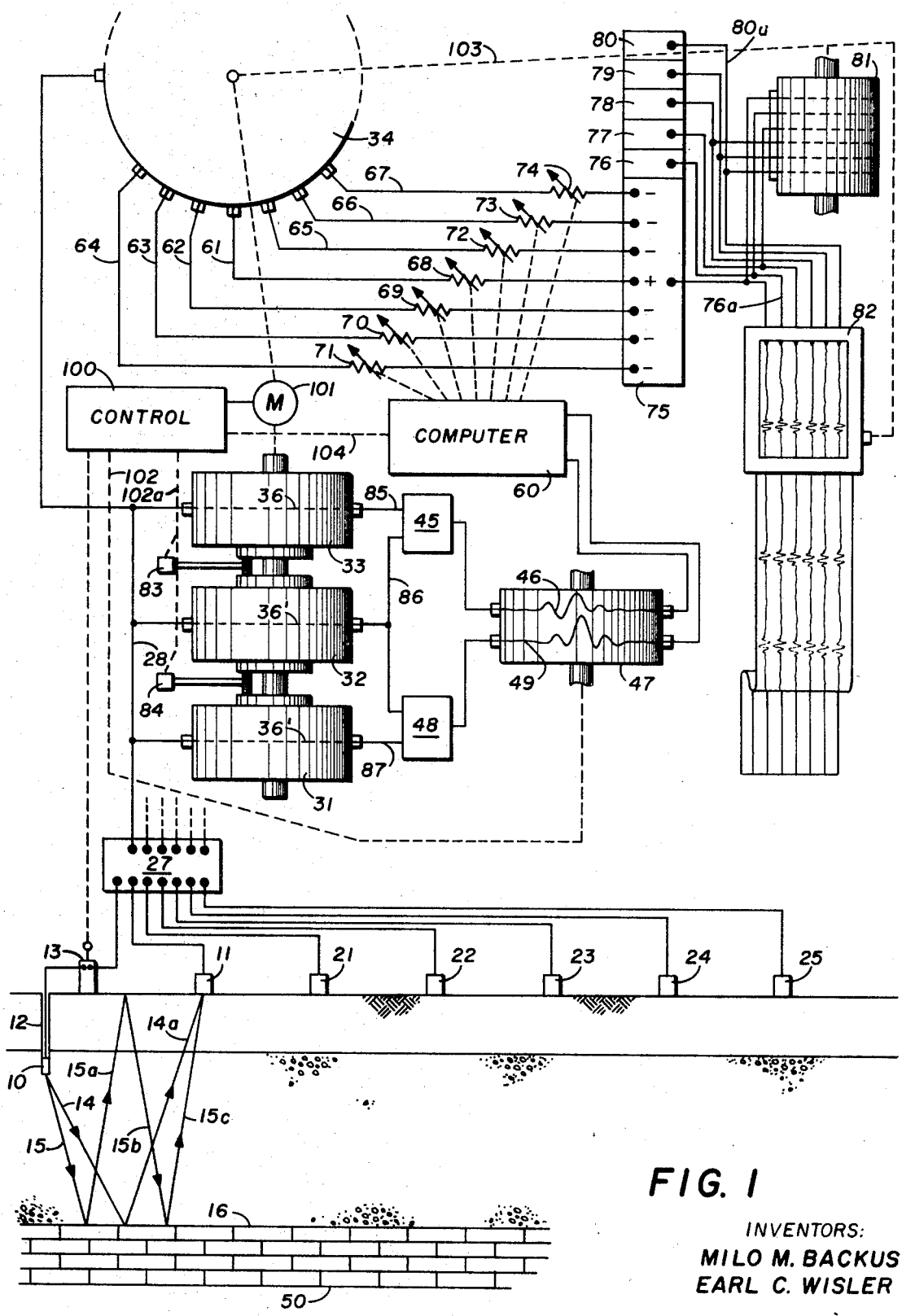
FIG. 1 is a diagrammatic view of a system embodying the present invention.

Referring now to FIG. 1, the problem to which the invention is directed is illustrated by considering travel of energy from an explosive 10 detected by a seismic detector 11. In usual practice, a charge of dynamite 10 is detonated in a borehole 12 by actuation of a blaster 13 to initiate seismic waves which travel in all directions from the source. The ray paths 14 and 15 represent the primary reflection from a subsurface reflector 16 and a first multiple of the primary reflections, respectively. Multiple energy travels to the reflector 16 and then back to the earth's surface as along the ray path 15a, where it is reflected downward. The energy then travels back to the reflector 16 by way of the ray path 15b, and again back to the surface by way of ray path 15c.

For the purpose of the present description, the relatively simple physical problem thus presented will be employed, and the signal output from the single detector 11 will be treated in detail. It should be kept in mind, however, that ordinarily, a seismic spread includes many detectors, such as detectors 21—25. A multielement spread is employed so that a suite of seismic signals will be produced to determine the presence of energy reflected from various depths.

Reflected energy may be identified by reason of the coincidence in the time occurrence of like high amplitude signals. Output signals from the spread detectors 11 and 21—25 are applied to an amplifier system 27 and then are stored for processing. The output signal from the detector 11 will now be considered in detail with the understanding that signals from the remaining detectors will similarly be processed. The output signal from detector 11 is applied by way of conductor 28 to a processing system which, in the form illustrated, includes four drum storage units 31—34.

An analog process is employed in the system of FIG. 1. The signal from detector 11 may be of the type illustrated by signal 36, FIG. 2. The instant of generation of the seismic pulse, which is the instant of the detonation of the explosive charge 10, is represented by the time break pulse 37. The primary energy traveling along path 14 is represented by the reflection 38. The first multiple of the reflection 38 is represented by the pulse 39. The second multiple is represented by the pulse 40. The signal 36 is stored on the drums 31—33. The same signal 36 may also be stored on drum 34.

The signals stored on drums 31—33 are employed for the purpose of synthesizing a filter which will selectively attenuate the multiple 39 with minimum attenuation of the primary reflection 38. Synthesis of a proper cross-equalization filter involves the auto-correlation of the signal 36 and the cross-correlation thereof with the same signal shifted by a time interval roughly equal to the time interval between the time break pulse 37 and the primary reflection 38. Such a shift has been illustrated in FIG. 2 with the signal 36' being shown displaced in time relative to signal 36 such that the time break pulse 37' is in approximate alignment with the primary reflection 38. The signal 36' is shifted on both drums 31 and 32.

Figure 2:
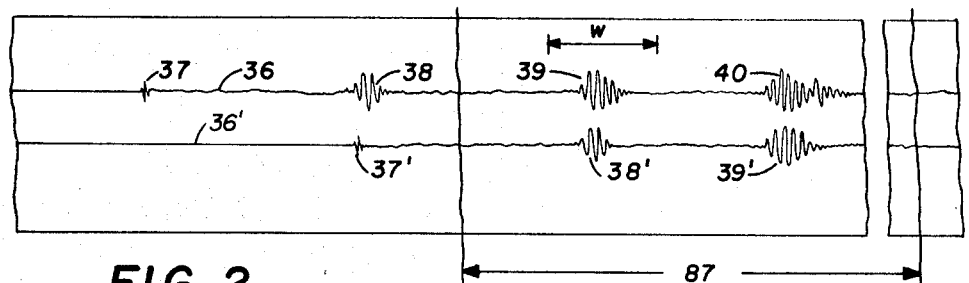
FIG. 2 is a time plot of a signal from one of the detectors of FIG. 1 illustrating the initial displacement for correlation processing.

It should be kept in mind that the signal illustrated in FIG. 2 is highly simplified for the purpose of the present description. In practice, the primary reflection as well as the first, second and high order multiples are combined with other signal compliments so that in general they do not appear on a seismogram as distinctive as shown in FIG. 2. It is often the case that the first multiple occurs at a record time which is substantially coincident with a primary reflection from a substantially deeper reflecting horizon. The elimination of the multiple energy then permits the deeper reflection to be displayed free or unmasked by the unwanted noise which, in this example, is in the form of multiple energy.

The cross-correlation function for signals 36 and 36' is produced at the output of multiplier-integrator 45 and the resultant cross-correlation function 46 is stored on a drum 47. The auto-correlation function 49 of signal 36' is produced from signals stored on both drums 31 and 32. Function 49 is produced at the output of multiplier 48 and is stored on drum 47. The cross-correlation and auto-correlation operations for producing the functions 46 and 49 are carried out over the interval or window $w$, FIG. 2, for the time delays $-\tau$ to $+\tau$. Window $w$ roughly is equal to the duration, in the signal 36, of the multiple waveform to be eliminated.

Cross-correlation and auto-correlation operations in general are well known in the treatment of seismic signals and, for this reason, the systems have been shown in block form. The systems may be of the analog type represented in FIG. 1 with a more general description being found in U.S. Pat. No. 2,927,656, columns 5 and 6, and in U.S. Pat. No. 3,131,375. The present invention involves the use of the correlation operations for locating, characterizing and eliminating the multiple energy.

In general, the multiple 39 will persist longer than the primary reflection 38. This is by reason of the fact that some of the downwardly traveling energy along the ray path 15 also travels to other reflecting surfaces, such as the bottom of the reflector 16 forming the interface 50. Furthermore, some of the upwardly traveling energy in the ray path 15a, is reflected downwardly at the base of the weathering 51. Thus, the multiple 39 is a more complex pulse than the primary reflection 38.

Primarily because of this difference, special filters are required to eliminate the multiples from the signal 36. Cross-correlation functions and auto-correlation functions are employed to synthesize the filter. The correlation functions are fed into a computer 60 which sets the values, for example, of resistances 68—74 in the output lines 61—67 leading from the storage drum 34 which serves as an element of a time-domain filter.

With the signal 36 stored on the drum 34 for playback purposes, the computer 60 determines the weights of the signals to be summed in an output unit 75. The output from unit 75 may then be either stored in reproducible form on a storage drum 81, or recorded as a wiggle trace or other visible recording produced by recorder 82.

As described thus far, only the signal from detector 11 has been referred to. As above noted, 12-trace and 24-trace recordings are conventionally employed. In the present case, the drums 31—34 may be multiple channel drums so that signals from detectors 21—25 may be treated. The computer 60 would be employed successively to evaluate and synthesize the filters in the additional channels (not shown) leading from the delay line drum 34 to the summing units 76—80. The outputs of summing units 76—80 are applied to the storage unit 81 and to the recorder 82 by way of channels 76a—80a. It is to be understood that the drums 31—34, 47 and 81 have been included in order to illustrate the functions involved. Some of the functions of FIG. 1 may be combined on or carried out in connection with use of a single drum without departing from the teachings of the present invention. Furthermore, while an analog system has been described, it is to be understood that the signals may be stored in registers in digital computer storage systems rather than on drums 31—34.

The generation of the seismic waves, as by detonation of the explosive charge 10 under the control of blaster 13, may be taken illustrative of well-known techniques. The generation of the seismic waves may be under the supervisory control of a unit 100 which controls the operations of the storage drums 31—34, computer 60 and the drums 47, 81 and recorder 82. By this means the signals (traces) may be recorded in predetermined relation to the shot instant. Such control systems are well known, a suitable system being described in U.S. Pat. No. 3,039,558 to Romberg.

Spread corrections may be introduced into the recording operation prior to the correlation operations. Spread corrections wherein both static and dynamic variables are compensated are made in accordance with well-known procedures. Such corrections are described in Geophysics, Vol. XV, Apr. 1950, page 227 et seq. in a paper entitled "Compensation Charts for Linear Increase of Velocity with Depth" by W. B. Agocs. A mechanism for applying spread corrections is disclosed in U.S. Pat. No. 3,092,805 to Koeijmans and in U. S. Pat. No. 2,948,880 to Thatcher. Since control and correction operations are generally well known, they are not described in detail herein.

As shown in FIG. 1, the control unit 100 is connected as to energize the motor 101 which may produce uniform rotation of the drums 31—34 and 81. The control unit 100 is coupled by way of linkage 102a to time shifting units 83 and 84 and to the drive for the drum 47. The linkage 102a is a stepping linkage to shift drum 32 relative to drum 33 an increment $\tau$ at the beginning of each playback cycle. Drum 31 is shifted relative to drum 32 by a similar increment. By this means, the points on the correlation functions 46 and 49 may be stored on drum 47 which is stepped synchronously with the shifting units 83 and 84.

The linkage 103 leading to drum 81 and recorder 82 may be actuated only when the time domain filter operation is to be carried out following the synthesis of the time domain filters. However, the linkage has been shown unbroken merely for the purpose of indicating the coordination between the several drums involved. The linkage 104 couples control unit 100 to the computer 60 for coordination of the synthesis of the filter weights.

In producing the correlation functions 46 and 49, the signals from detector 11 initially are recorded on drums 31—34. The drums 31 and 32 are then both shifted in their time axis relative to drum 34 as by operation of the shifting unit 83. Thereafter, the signals 36 and 36' are cyclically reproduced. During a first cycle, the signals appearing on the output lines 85 and 86 are multiplied and the product is integrated in unit 45 over the length of the time gate 87, FIG. 2, to produce one point on the cross-correlation function 46. Similarly, signals on the lines 86 and 87 are multiplied and integrated in the unit 48 to produce one point on the auto-correlation function 49. Prior to the second cycle, the shifting units 83 and 84 are actuated to shift the drums by a time increment $\tau$. During the second cycle, a second point on the cross-correlation function 46 and a second point on the auto-correlation function 49 are determined. The drums are then successively shifted by increments of $\tau$ to cover the entire window $w$. The time increment $\tau$ may be within the range of from 1 to 5 milliseconds and preferably is of the order of about 2 milliseconds but may vary depending upon the frequency band width desired.

In general, the signal channels leading from the drum 34 will be in number equal to one-half the number of increments of $\tau$ in window $w$ plus one. The computer 60 will evaluate, for each of the delay intervals, the weight for one of the signals to be included in the input to the summing unit 75. The signal on the channel 61 will be of a first polarity. The signals on channels 62—67 will be of reverse polarity so that there will be subtracted from the signal on trace 36 functions representative of the multiple 39. Substantial reduction in multiple 40 will also be accomplished. The resultant signal then appears on output channel 75a leading to units 81 and 82.

Mathematically, the synthesis and filter operations may be described as follows. The information signal, $p(t)$, additive incoherent noise, $n(t)$ and feedback interference, $m(t)$, are functions which define the character of signal 36. The multiple or feedback interference has the following character:

$$m(t)=p(t-T)*h(t)+p(t-2T)*h(t)*h(t) \quad (1)$$
$$+\ldots+p(t-kT)*h(t)*h(t)\ldots*h(t)$$

or $m(t)=\sum_{k=1}^{K} p(t-kT)*h^k(t) \quad (2)$ where $h^k(t)=h(t)$ characterizes the earth filter and is convolved (*) with itself $k$ times. The received signal trace 36 is $f(t)$ where:

$$f(t)=p(t)+m(t)+n(t). \quad (3)$$

The optimum linear filter of the present invention will attenuate (in least-mean-square error sense) the interfering signal $m(t)$ in the interval $T<t<2T$ where $T$ is the shift between signals 36 and 36'. FIG. 2.

The interfering signal, $m(t)$, in the interval $T$
$$m_1(t)=p(t-T)*h(t). \quad (4)$$

The function $h(t)$ is determined by computing the cross-equalization filter which transforms $f(t)$ (reflection 38) into $f(t-T)$ (multiple 39) by correlating a gated interval $w$ from $f(t)$ with a second, delayed gate from $f(t-T)$ and treating the result as a cross-correlation function 46. The cross-correlation function 46 and the auto-correlation function 49 obtained from the window $w$ are then used as inputs to the cross-equalization filter synthesizer to obtain filter $g(t)$, which is an optimum estimate of $h(t)$ in the least-mean-square error sense.

The filter, $g(t)$, when convolved with $f(t)$ over the interval $0<t<$ denoting the estimate of $m_1(t)$ gives:

$$\hat{m}_1(t)=f(t)*g(t)=p(t)*g(t)+n(t)*g(t). \quad (5)$$

The output, delayed by time lag $T$, gives
$$\hat{m}_1(t-T)=f(t-T)*g(t)+n(t-)*g(t). \quad (6)$$

This result, when subtracted from $f(t)$, gives
$$f(t)-\hat{m}_1(t-T)=f(t)p(t-T)*[h(t)-g(t)] \quad (7)$$
$$+n(t)-n(t-T)*g(t). \quad t<$$

Thus, the interfering signal is attenuated to $p(t-T)*[h(t)-gQt)]$ where $g(t)$, the cross-equalization filter, is the best approximation for $h(t)$ when the filtering effect of $h(t)$ has been obscured by additive incoherent noise. The filter, $g(t)$, is determined from truncated ($w$) auto-correlation and cross-correlation functions. For any truncated correlation width of window $w$, $g(t)$ is the optimum filter for attenuating $m_1(t)$.

This process has been applied to data processing of seismic records. The problem solved by the invention is attenuation of the first multiple reflection from a strong multiple reflection generator. Results have shown that the first multiple 39 is attenuated 14—16 db. relative to primary reflection 38.

The filtering effectiveness drops off at long spread distances such as between the shot point 12 and the spread 11, 21—25. Application of the filter is most useful where the normal move-out difference between the primary and multiple remains relatively constant in the gated interval. Actual data indicates that attenuation drops to 6 db. at an offset distance of 2,200 feet. The process is optimum where there is a strong multiple reflection generator such as the boundary 16 and in an area where there is a favorable signal-to-noise ratio in the seismic signal frequency band of from 20 to 100 c.p.s.

Where the two time series 36 and 36' may be designated as $u(t)$ and $v(t)$, the following expressions are applicable to the problem of synthesizing the filter $g(t)$:

$$u(t)=f(t)+n(t) \quad (8)$$
$$v(t)=g(t)+n'(t) \quad (9)$$
and $g(t)=(t)*h(t)$, where $\quad (10)$ $n(t)$ and $n'(t)$ are incoherent noise functions. From this, the optimum linear filter for transforming $u(t)$ into $v(t)$, or equivalently, for transforming $f(t)$ into $g(t)$ in the presence of noise, may be synthesized.

More particularly, the optimum linear filter for obtaining a solution to Equation 7 is the cross-equalization filter, which is a time-domain filter corresponding with the solution to the equation $\sum_{m=\infty}^{0} X\times Y_m Z \quad (11)$ for a set of filter weights, $Y_m$. The filter weights $Y_m$ satisfy the above equation (in the least-mean-square error sense) for all values of $\tau$ where $X$ is the auto-correlation matrix for function 49, $Y_m$ is the matrix for the filter function $g(t)$ and $Z$ is the matrix for the cross-correlation function 46.

The filtering operation illustrated in FIG. 1 involves a time-domain filter unit including drum 34 in which the amplitude of the signal from each of the pickup points on the storage drum is selectively attenuated by units 68—74, following which the signals are summed in unit 67. A servo system in computer 60 may be employed to adjust units 68—74, such as in the magnetic delay line filter described by Hal J. Jones et al. in a paper entitled "Magnetic Delay Line Filtering" in Geophysics, Vol. XX, Oct. 1955, page 745 et seq. In the latter case, the components of the signal are controlled in amplitude by a variable resistance in each signal line. Alternatively, an amplifier may be substituted for variable resistors 68—74 and the gains of the amplifiers may be controlled by gain control voltages generated in the computer 60. Such gain control voltages from the computer 60 produced from treatment of the cross-correlation and auto-correlation functions may thus be used to control the weights of signals on channels 61—68.

The computer 60 and its mode of operation may best be understood by referring to the relationships expressed in Equation 11 which indicated that the auto-correlation signal $X$, when treated by a filter $Y_m$, will result in a cross-correlation signal $Z$. Computer 60 inverts the matrix $X$ and solves the resulting expression for the seven values or weights to be given the signals applied to the summing unit 75. By way of example, Equation 11 in matrix form for a 7-point operator or filter $Y_m$ may be written:

$$\begin{bmatrix} X0 & X1 & X2 & X3 & X4 & X5 & X6 \\ X(-1) & X0 & X1 & X2 & X3 & X4 & X5 \\ X(-2) & X(-1) & X0 & X1 & X2 & X3 & X4 \\ X(-3) & X(-2) & X(-1) & X0 & X1 & X2 & X3 \\ X(-4) & X(-3) & X(-2) & X(-1) & X0 & X1 & X2 \\ X(-5) & X(-4) & X(-3) & X(-2) & X(-1) & X0 & X1 \\ X(-6) & X(-5) & X(-4) & X(-3) & X(-2) & X(-1) & X0 \end{bmatrix} \begin{bmatrix} Y(-3) \\ Y(-2) \\ Y(-1) \\ Y0 \\ Y1 \\ Y2 \\ Y3 \end{bmatrix} = \begin{bmatrix} Z(-3) \\ Z(-2) \\ Z(-1) \\ Z0 \\ Z1 \\ Z2 \\ Z3 \end{bmatrix} \quad (12)$$

where:
X0, X(−1), X(−2), X(−3), X(−4), X(−5), X(−6), X1, X2, X3, X4, X5, and X6 are the numerical values of the auto-correlation function 49 at a time delay $\tau=0, -1, -2, -3, -4, -5,$ −6, 1, 2, 3, 4, 5, and 6, respectively.

Z0, Z(−1), Z(−2), Z(−3), Z1, Z2, and Z3 are the numerical values of the cross-correlation function 46 at time delays $\tau=0, -1, -2, -3,$ 1, 2, and 3, respectively.

As to the remaining elements of the matrix $Y(-1)$, $Y(-2)$, $Y(-3)$, $Y0$, $Y1$, $Y2$, and $Y3$ are the filter weights of the elements in lines 61, 62, 63, 64, 65, 66, and 67, respectively.

In order to solve Equation 12 for the values of the filter points at the delay intervals $\tau=(-3), (-2), (-1), 0, 1, 2,$ and 3, the X matrix of Equation 12 is inverted and the solution is then formulated for each of the seven filter points. The operation mathematically is indicated in Equation 13

$$\begin{bmatrix} Y(-3) \\ Y(-2) \\ Y(-1) \\ Y0 \\ Y1 \\ Y2 \\ Y3 \end{bmatrix} = [X]^{-1} \begin{bmatrix} Z(-3) \\ Z(-2) \\ Z(-1) \\ Z0 \\ Z1 \\ Z2 \\ Z3 \end{bmatrix} \quad (13)$$

The inversion of Equation 12 to Equation 13 may be undertaken in accordance with any one of several well-known techniques, of which the Crout reduction technique is exemplary. By this means, the unknown $Y_m$ quantities may be evaluated for each delay interval of interest. More particularly, signals are produced, one for each delay interval, and are applied to unit 75, FIG. 1, to control the amplitudes of the signals from delay line drum 34 prior to addition in unit 75. Where a delay interval $\tau=0.002$ seconds is employed in the production of the cross-correlation function 46 and the auto-correlation function 49, the spacing of detector heads on drum 34 will be equal to 0.002 seconds record time.

Figure 3:
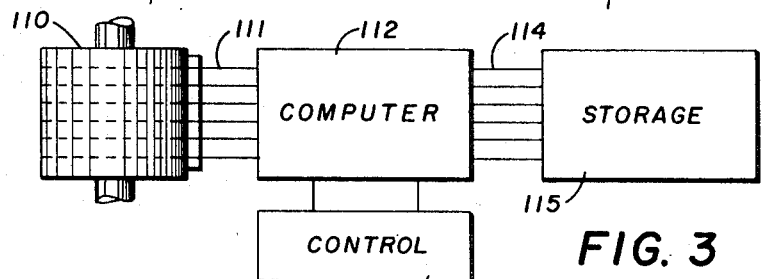
FIG. 3 illustrates a digital filter process.

Operations generally involve 12 and 24-trace recordings, and time delay filters having as many as 25 or more delay intervals or points are required. It will be apparent that, for such operations, the matrix of Equation 12 becomes very large. Such large matrices are most expeditiously evaluated and filter point signals produced in digital computers having large data-handling capacity. In FIG. 3, multitrace seismic data is stored on drum 110 and is reproduced and applied by way of channels 111 to computer 112. The computer 112 is programmed under the control of a unit 113 to determine, adjust or fix the filter corresponding with the solution to Equation 11. The computer 112 will then produce on output channels 114 the filtered seismic signals. The latter signals are then applied to a storage unit 115 shown in the form of a magnetic drum storage unit. Storage may be temporary electronic storage, or alternative forms of readout may be employed, including the production of a visible or wiggle trace seismogram.

The operation may be carried out in the system of FIG. 3 in accordance with well-known systems and methods of operating the same but guided by the requirements of the method set forth herein. Digital filtering, in general, is well known as indicated in "Principles of Digital Filtering" by Robinson and Treitel, *Geophysics*, Vol. XXIX, No. 3, June 1964, pp. 395—404. Thus, the control unit 113 of FIG. 3 may readily be programmed to carry out the operation indicated in Equation 11.

While the analog filtering operation illustrated in FIG. 1 may be employed, when large sets of data and the multipoint filters are involved, a digital computer operation will be preferred.

Figure 4:
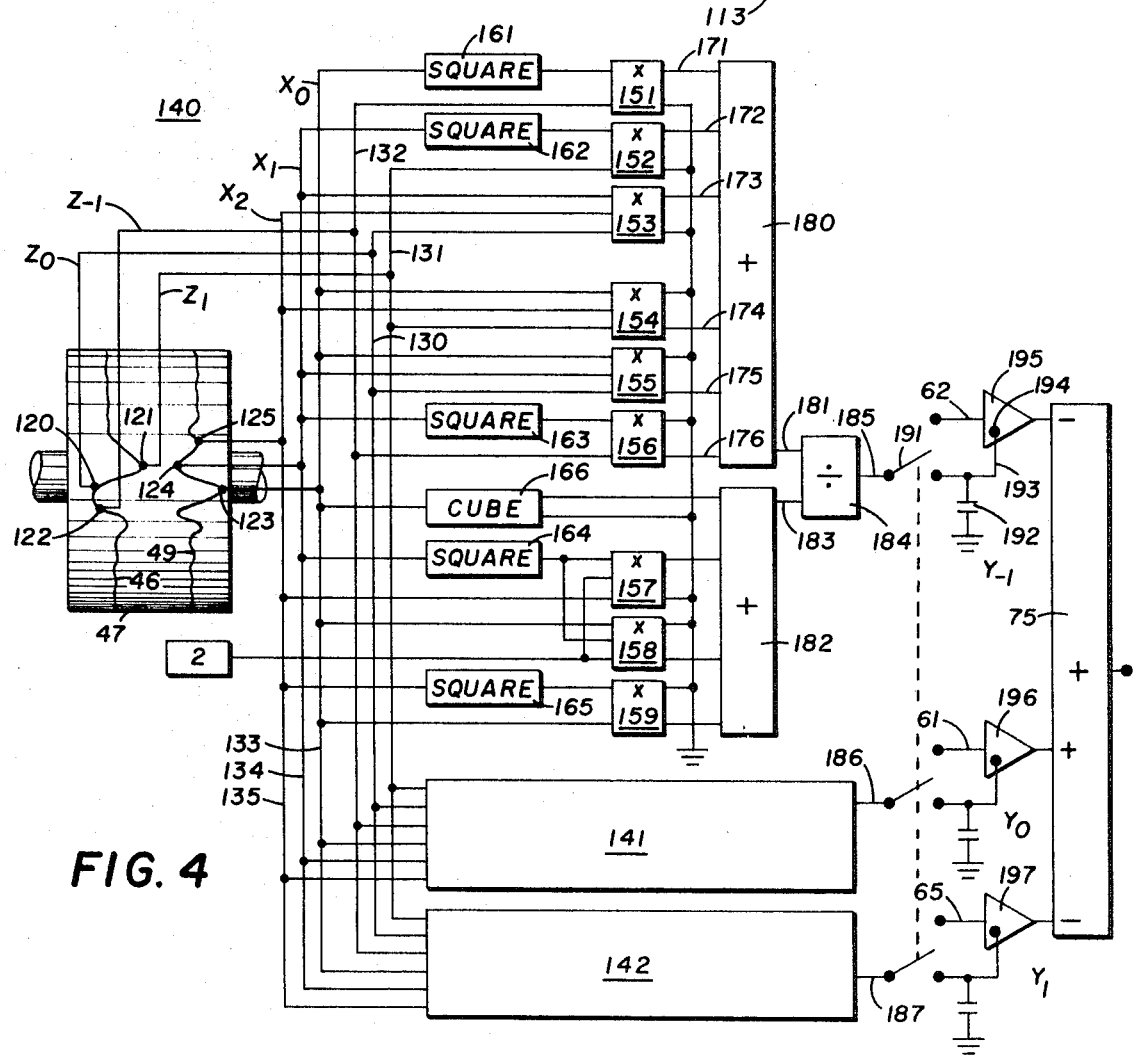
FIG. 4 illustrates one form of the analog computer of FIG. 1.

In order to further illustrate the operation of the computer of FIG. 3, as well as to further explain the invention, the analog computer operation is further developed in FIG. 4. The computer 60 of FIG. 1 may take the form illustrated in FIG. 4 for a simplified 3-point filter. The same principles illustrated in FIG. 4 would be involved for the 7-point filter of FIG. 1 or for more complex filters.

The cross-correlation function 46 and the auto-correlation function 49 are stored on drum 47. For the purpose of the present description, representations of the cross-correlation function 46 and the auto-correlation function 49 have been illustrated together with pickup devices for reproducing the data stored on the drum 47. The pickup 120 produces a signal representative of the cross-correlation function at time $\tau=0$ for the function Z0 of Equation 12. The signals from pickups 121 and 122 correspond with the elements Z1 and Z2 of Equation 12. Signals from pickups 123, 124 and 125 correspond with the elements X0, X1 and X2 of Equation 12.

Since the auto-correlation function 49 is symmetrical, the values X1 and X2 correspond with the values X(−1) and X(−2), respectively. Thus, for a solution to Equation 12, but limited to a 3-point filter, the necessary correlation signal data appears on the readout busses 130—132 and 133—135.

The system of FIG. 4 serves to solve Equation 12. The solution to Equation 12, limited to a 3-point filter, is indicated in Equations 14, 15 and 16. Equation 14 defines the magnitude of the signal to be applied from channel 62, FIG. 1, to summing unit 75. Equation 15 represents the magnitude of the signal to be applied by way of channel 61, and Equation 16 represents the relative magnitude of the signal to be applied by way of channel 65.

$$Y(-1) = \frac{\begin{bmatrix} Z(-1) & X1 & X2 \\ Z0 & X0 & X1 \\ Z1 & X1 & X0 \end{bmatrix}}{\begin{bmatrix} X0 & X1 & X2 \\ X1 & X0 & X1 \\ X2 & X1 & X0 \end{bmatrix}} \quad (14)$$

$$Y0 = \frac{\begin{bmatrix} X0 & Z(-1) & X2 \\ X1 & Z0 & X1 \\ X2 & Z1 & X0 \end{bmatrix}}{[D]} \quad (15)$$

$$Y1 = \frac{\begin{bmatrix} X0 & X1 & Z(-1) \\ X1 & X0 & Z0 \\ X2 & X1 & Z1 \end{bmatrix}}{[D]} \quad (16)$$

$$Y(-1) = \frac{[X0^2 Z(-1) + X1^2 Z1 + X1 X2 Z0 \\ -Z1 X0 X2 - X1 X0 Z0 - Z(-1) X1^2]}{[D]} \quad (17)$$

where:

$$D = [X0^3 + 2X1^2 X2 - 2X0 X1^2 - X0 X2^2]$$

$$Y0 = \frac{[X0^2 Z0 + Z(-1) X1 X2 + X1 X2 Z1 \\ - X2^2 Z0 - X0 X1 Z(-1) - X0 X1 Z1]}{[D]} \quad (18)$$

$$Y1 = \frac{[X0^2 Z1 + X1 X2 Z0 + X1^2 Z(-1) \\ - X0 X2 Z(-1) - X1^2 Z1 - X0 X1 XZ0]}{[D]} \quad (19)$$

The operations illustrated in FIG. 4 may readily be performed for an inverted matrix by analog means so long as accuracy is maintained. Only addition, multiplication and division of voltages are involved in the operation of the computer of FIG. 4. The solutions to the Equations 14—16 are expressed in Equations 17—19 which should be considered along with FIG. 4. The portion of the computer of FIG. 4 for computing the value of the filter point Y(−1) has been illustrated in detail in the channel 140 of FIG. 4. Channels 141 and 142 are employed for obtaining the values for the filter points Y0 and Y1.

Channel 140 involves nine multipliers, 151—159. The units 151—156 and the associated circuits are employed to provide the solution to the numerator of Equation 17. The multipliers 157—159 are employed to provide a solution to the denominator of Equation 17.

A squaring unit 161 is connected to one input of the multiplier 151. A squaring unit 162 is connected to one input of the multiplier 152. A squaring unit 163 supplies one input of multiplier 156. A squaring unit 164 supplies one input of multiplier 157, and a squaring unit 165 supplies one input of multiplier 159. A unit 166 produces an output which is the cube of the input signal applied thereto.

The input to the squaring unit 161 is connected to the X0 bus 133. The second input to the multiplier 151 is connected to Z(−1) bus 132. Thus, there is produced an output on line 171 proportional to the quantity $X0^2 Z(-1)$.

The input to the squaring unit 162 is connected to the X1 bus 134. The second input to the multiplier 152 is connected to the Z1 bus 131. Thus, there is produced on output line 172 a voltage representative of the quantity $X1^2 Z1$ of Equation 17.

In a similar manner, the output on line 173 is produced representing the third element of the numerator of Equation 17, namely the quantity $X1 X2 Z0$. The voltage on line 174 is produced representative of the fourth element of the numerator of Equation 17, namely the quantity $Z1 X0 X2$. The voltage on line 175 is representative of the fifth element of the numerator of Equation 17, namely the quantity X1X0Z0. The signal on line 176 is representative of the sixth or last element of the numerator of Equation 17, namely the quantity Z(-1)Xb[2.

It will be noted that the voltages on lines 174, 175 and 176 are applied to a summing unit 180 with a polarity which is opposite that of the voltages on lines 171—173. Thus, the output from the summing unit 180 appearing on the channel 181 is representative of the numerator of Equation 17.

Voltages are applied from the cube unit 166 and the multipliers 157, 158 and 159 to a summing unit 182. The output voltage from the summing unit 182 appearing on channel 183 represents the denominator of Equation 17. The signals on channels 181 and 183 are applied to a dividing unit 184. Thus, the output of the unit 184, as appearing on output channel 185, represents the solution to Equation 17.

The solution to Equation 18 is represented by a voltage appearing on the output channel 186 of the computer channel 141. A voltage representing the solution to Equation 19 appears on output channel 187 of the computer channel 142.

The channel 185 is connected by way of a switch 191 to a storage capacitor 192 which is connected to ground and, by way of a conductor 193, to a gain control input terminal 194 of an amplifier 195. In this system, an amplifier 195 in line 62 replaces the variable resistance 69 of FIG. 1 so that the signal from the delay drum 34 of FIG. 1 will be amplified in proportion to the gain control voltage stored on capacitor 192 upon closure of switch 191. In a similar manner, control voltages are applied to amplifiers 196 and 197 representing the values of the solutions to Equations 18 and 19. Amplifier 196 may be considered as substituted for the impedance 68 of FIG. 1 and channel 61. The amplifier 197 may be considered as substituted for the resistance 72 in line 65 of FIG. 1. Thus, the output signals from amplifiers 195, 196 and 197 are applied to the inputs of the summing unit 75 of FIG. 1 with the instantaneous polarities of the voltages from amplifiers 195 and 197 opposite the polarity of the output voltage from amplifier 196.

Having described the invention in connection with certain specific embodiments thereof, it is to be understood that further modifications may now suggest themselves to those skilled in the art and it is intended to cover such modifications as fall within the scope of the appended claims.

What we claim is:

1. A method of suppressing multiple reflection energy in an electrical seismic trace comprising the steps of:
   a. generating an electrical seismic trace representing the resultant seismic waves detected at a receiving location in response to a seismic disturbance created at a sending location, and
   b. causing an automatically operable system to perform the steps of:
      i. generating an electrical auto-correlation function of said electrical seismic trace,
      ii. generating an electrical cross-correlation function of said electrical seismic trace and said electrical seismic trace delayed a time interval of the order of the record time of the primary reflection energy and over a time gate which excludes the primary reflection energy in said electrical seismic trace,
      iii. generating control signals responsive to said electrical auto-correlation and cross-correlation functions proportional to said electrical cross-correlation function divided by said electrical auto-correlation function,
      iv. successively time shifting said electrical seismic trace to produce a plurality of electrical traces and relatively modifying the electrical traces in response to said control signals, and
      v. summing the time shifted and modified electrical traces to produce a composite electrical output trace.

2. A method of suppressing multiple reflection energy in an electrical seismic trace, comprising the steps of:
   a. creating a seismic disturbance,
   b. detecting the resultant seismic waves and producing an electrical seismic signal representative thereof, and
   c. causing an automatically operable system to perform the steps of:
      i. generating an electrical auto-correlation function of said electrical seismic trace,
      ii. generating an electrical cross-correlation function of said electrical seismic trace and said electrical seismic trace delayed a time interval of the order of the record time interval of the primary reflection energy and over a time gate which excludes the primary reflection energy in said electrical seismic trace,
      iii. generating control signals responsive to said electrical auto-correlation and cross-correlation functions proportional to said electrical cross-correlation function divided by said electrical auto-correlation function,
      iv. applying said electrical seismic trace to an uneven number of channels,
      v. successively time shifting the electrical traces in some of said channels in a positive direction with respect to the electrical trace in one of said channels,
      vi. successively time shifting the electrical traces in the other of said channels in a negative direction with respect to the electrical trace in said one of said channels,
      vii. relatively modifying the electrical traces in said channels in accordance with said control signals, and
      viii. summing the time shifted and modified electrical traces from said channels with the polarity of the electrical signal in said one of said channels reversed.

3. A method of suppressing multiple reflection energy in an electrical seismic trace comprising the steps of:
   a. creating a seismic disturbance and detecting the resultant seismic waves to produce an electrical seismic trace representative thereof, and
   b. causing an automatically operable system to perform the steps of:
      i. storing said electrical seismic trace in at least two independently reproducible forms,
      ii. cyclically reproducing the stored electrical seismic traces with successive changing time delays $0.35\ \tau$ to produce an electrical auto-correlation function of said electrical seismic trace,
      iii. cyclically reproducing the stored electrical seismic traces with successively changing time delays $T\pm\tau$ to produce an electrical cross-correlation function, where $T$ is a time shift between the electrical seismic traces of the order of the record time producing primary reflection energy and any multiple thereof at a record time of $2T$,
      iv. generating control signals responsive to said electrical cross-correlation and auto-correlation functions proportional to said electrical cross-correlation function divided by said electrical auto-correlation function,
      v. reproducing one of said stored electrical seismic traces,
      vi. successively time shifting the reproduced electrical seismic trace to produce a plurality of time shifted electrical traces, modifying said plurality of time shifted electrical traces in accordance with said control signals, and
      vii. summing said time shifted and modified electrical traces to produce a composite electrical output trace.

4. The method of multiple suppression in seismic exploration which comprises:
   a. generating and detecting seismic waves to produce a seismic signal trace which includes a primary reflection, and
   b. causing an automatically operable system to perform the steps of:
      i. generating an auto-correlation function $X$ of said signal trace for a plurality of delay intervals,
      ii. generating a cross-correlation function $Z$ for said plurality of delay intervals between (1) said signal trace undelayed and (2) said signal trace delayed a time interval of the order of the record time of the primary reflection and over a time gate which excludes the primary reflection in the undelayed signal trace, and
      iii. time domain filtering said signal with relative amplitudes proportional to $(Y_m)$ in the matrix $(Y_m)\ X=Z$ to suppress any multiple of said primary reflection in said signal trace at a record time of the order of twice the time of said primary reflection.